Figure 1:
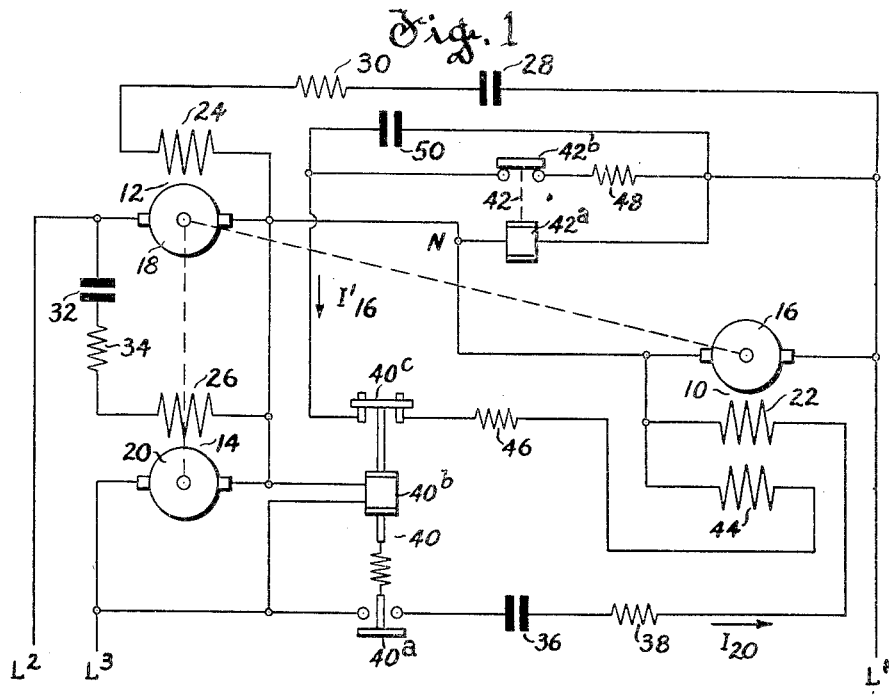

Jan. 22, 1957  N. L. SCHMITZ  2,778,985
SYSTEM FOR THE GENERATION OF POLYPHASE ALTERNATING CURRENTS
Filed May 29, 1952

Inventor
Norbert L. Schmitz
By W. C. Lyon
Attorney 2,778,985

SYSTEM FOR THE GENERATION OF POLYPHASE ALTERNATING CURRENTS

Norbert L. Schmitz, Madison, Wis., assignor to Cutler-Hammer, Inc., Milwaukee, Wis., a corporation of Delaware Application May 29, 1952, Serial No. 290,641

4 Claims. (Cl. 322—28)

This invention relates to a system for the generation of polyphase alternating currents.

The present invention is similar in certain respects to a system shown in the Schmitz Patent No. 2,619,629, issued November 25, 1952, and is an improvement.

A primary object of the present invention is to provide an improved system for the generation of polyphase alternating currents.

Another object is to provide a starting system for low frequency polyphase generating systems, and A further object is to provide a system of the aforementioned type which is rugged and positive in its operation while inexpensive to manufacture and maintain.

Figure 2:
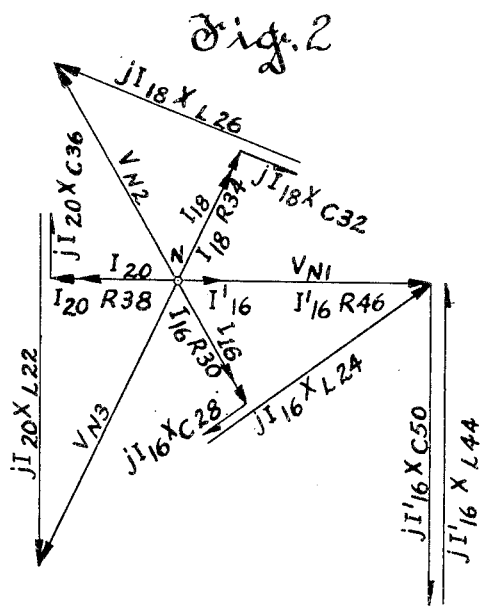

Other objects and advantages of the invention will be apparent upon reading of the detailed description of a preferred embodiment of my invention together with the drawing in which:

Figure 1 is a diagrammatic showing of an improved polyphase generating system embodying the invention, and Fig. 2 is a vector diagram of certain voltage and current relationships existing in the system of Fig. 1 during a certain operating condition.

Referring to Fig. 1, it shows three electrodynamic machines generally designated 10, 12 and 14 having armatures 16, 18 and 20 and field windings 22, 24 and 26, respectively. The machines 10, 12 and 14 are mechanically interconnected for common drive thereof by a prime mover not shown. In the at-rest position of the system a certain degree of residual magnetism resides in the field iron of machine 10.

The three armatures and three fields are symmetrically interconnected in that one terminal of each of said armatures and each of said fields has connection to a common terminal N, and the other terminal of each armature has connection to one of load supply lines $L^1$, $L^2$, $L^3$. In addition, said other terminal of the armature of each machine has connection through a phase shift network which, in the preferred embodiment of my invention, comprises the series combination of a capacitor and a resistor and the field winding of another machine to common terminal N. Thus there is connected in shunt with armature 16, the series combination of capacitor 28, resistor 30 and field winding 24. Connected in shunt with armature 18 is the series combination of capacitor 32, resistor 34 and field winding 26. In shunt with armature 20 is the series combination of capacitor 36, resistor 38, field winding 22, and the normally open contacts 40ᵃ of a relay 40 which comprises in addition an electromagnetic operating winding 40ᵇ and normally closed contacts 40ᶜ.

It is considered preferable, although not essential, that relay 40 be so constructed that closure of contacts 40ᵃ and opening of contacts 40ᶜ is not accomplished until after operating coil 40ᵇ, which is connected in shunt with armature 20, has been energized for at least a few cycles. The use of dashpots and other expedients to accomplish such delay is well known. Moreover, contacts 40ᶜ are adjusted to open at the same time or later than contacts 40ᵃ close.

Another relay 42 comprising an electromagnetic operating winding 42ᵃ and normally closed contacts 42ᵇ has its operating winding 42ᵃ connected in shunt with armature 16 of the machine 10.

Also connected in shunt with armature 16 is a series circuit comprising an auxiliary field winding 44 of machine 10, a resistance 46, contacts 40ᶜ, contacts 42ᵇ and a resistor 48. A capacitor 50 is connected in parallel with the series combination of contacts 42ᵇ and resistor 48.

The operation of the system will now be described with reference being made to Fig. 2. As aforementioned, the mechanically interconnected armatures 16, 18 and 20 are driven in unison. As soon as rotation of armature 16 begins, a voltage is developed therein by the residual magnetism which causes flow of a current, designated $I'_{16}$, through resistor 48, contacts 42ᵇ, contacts 40ᶜ, resistor 46, and auxiliary field winding 44. The field strength is thus increased to increase the voltage generated by armature 16. The latter process is repeated and the voltage of armature 16 builds up. Operating coil 42ᵃ, connected in shunt with armature 16, is subjected to the generated voltage of armature 16 and is made operative to open contacts 42ᵇ at a voltage less than the saturation voltage of machine 10. Opening of contacts 42ᵇ opens the current path through resistor 48 to establish a series resonant circuit of appropriate resonant frequency comprising the combination of capacitor 50, contacts 40ᶜ, resistor 46 and winding 44.

The resonant circuit thus established has connection in shunt with armature 16. Current $I'_{16}$ continues to flow in the same direction in the latter circuit and increases until sufficient charge has been accumulated in capacitor 50 to stop further rise in the generated voltage, designated $V_{N1}$ in Fig. 2, of armature 16. Thereafter the voltage $V_{N1}$ is decreased as capacitor 50 continues to charge until said voltage becomes less than the voltage across the series combination of capacitor 50, resistor 46 and winding 44. At that time, capacitor 50 begins discharge of current in the opposite direction through armature 16 to start the second half cycle of self-excited operation of machine 10. The latter described action is repeated except that once open, contacts 42ᵇ remain open for the duration of operation of the system.

Thus in starting the system one of the machines, machine 10 of the system herein described, is operated as a self-excited generator having a non-oscillatory field circuit until a predetermined voltage has been built up. Upon reaching said predetermined voltage in the generator, its field circuit is made oscillatory whereby the machine becomes operative as a self-excited alternating current generator preparatory to transition to normal running of the system as will next be described.

In addition to current $I'_{16}$, armature 16 supplies a current, designated $I_{18}$, to field winding 24 of machine 12 through the series combination of capacitor 28 and resistor 30. The impedance of the latter circuit has a value such as to cause current $I_{18}$ to lag the generated voltage $V_{N1}$ of armature 16 by 60 electrical degrees. Thus excited, field winding 24 causes a voltage, designated $V_{N2}$, and differing in phase by 120 electrical degrees from voltage $V_{N1}$, to be generated by armature 18. Voltage $V_{N2}$ causes flow of a current, designated $I_{18}$, in the series circuit comprising capacitor 32, resistor 34 and the field winding 26 of machine 14, which circuit has an impedance value to cause current $I_{18}$ to lag voltage $V_{N2}$ by 60 electrical degrees. Excitation of winding 26 by current $I_{18}$ causes armature 20 to generate a voltage, designated $V_{N3}$, which has a phase difference of 120 electrical degrees from each of voltages $V_{N1}$ and $V_{N2}$.

Operating winding 40$^b$ is subjected to voltage V$_{N3}$ because of its shunt connection with armature 20. At a predetermined value of voltage V$_{N3}$, or of voltage V$_{N1}$ which in a given system determines voltage V$_{N3}$, operating winding 40$^b$ tends to close contacts 40$^a$ and open contacts 40$^c$. After winding 40$^b$ has been energized for a few cycles of its excitation current closure of contacts 40$^a$ and opening of contacts 40$^c$ is effected. The delay time in cycles is chosen such that any transient currents in the system resulting from opening of contacts 42$^b$ of relay 42 will have been diminished to some desired value.

Upon closure of contacts 40$^a$ a current designated I$_{20}$ is caused by voltage V$_{N3}$ to flow through contacts 40$^a$ and the series combination of capacitor 36, resistor 38 and field winding 22 of machine 10. The impedance of this combination has value such that current I$_{20}$ lags voltage V$_{N3}$ by 60 electrical degrees. Thus as shown in Fig. 2, currents I'$_{16}$ and I$_{20}$, flowing in field windings 44 and 22 respectively, differ in phase by 180 electrical degrees. Since the winding direction of each of field windings 44 and 22 is opposite that of the other, said field windings have aiding, exciting effect on armature 16.

The self-exciting effect on armature 10 of winding 44 is terminated by the opening of contacts 40$^c$ to deenergize winding 44 and thereafter armature 16 is separately-excited by armature 20. Thus each machine of the system is separately-excited by another machine and the system is in normal running condition.

Contacts 40$^c$ open at the same time as contacts 40$^a$ close, or very shortly thereafter, so that the transition from self-excitation to separate-excitation of machine 10 is electrically smooth.

During normal running the voltages V$_{N1}$, V$_{N2}$ and V$_{N3}$ generated by armatures 16, 18 and 20, respectively, appear between the common terminal N and load supply lines L$^1$, L$^2$, L$^3$, respectively, and each of said voltages is 120 electrical degrees out of phase with each of the others.

Upon shutting down the system by slowing and stopping the prime mover, the generated voltages are diminished to zero. Before the machines are completely stopped, the operating windings of relays 40 and 42 become sufficiently deenergized to allow closure of contacts 40$^c$ and 42$^b$ and opening of contacts 40$^a$. Machine 10 is thus returned to self-excited operation with the non-oscillatory field circuit and residual magnetism of proper polarity for restarting of the sytem is built up in machine 10 by the voltage generated in armature 16 during the remainder of the slowdown to stopped condition.

While the embodiment of my invention in a three phase generating system has been described, it is readily apparent that it may be similarly embodied in systems for generating power of five or more phases by use of a like number of machines and appropriate phase shifting means.

Having consideration for the space required, internal resistance and heating, auxiliary winding 44 ideally is made to have the square root of two times as many turns as does field winding 16.

Although I have shown and described a specific embodiment of my invention and have indicated certain modifications, I am fully aware that other modifications thereof are possible. My invention, therefore, is not to be restricted except in so far as is necessitated by the prior art and by the spirit of the appended claims.

I claim:

1. For a polyphase alternating current generating system having a plurality of electrodynamic machines of the type having an armature and an exciting field winding wherein the field of each machine is excited during normal running operation of the system by dephased current generated in the armature of another of said machines, a starting system comprising in combination, oscillatory exciting means for one of said machines normally connected in parallel with the armature thereof and including an auxiliary field winding to effect self-excitation of said one machine as an alternating current generator, and means operable to disconnect said first mentioned means upon development of a predetermined voltage by the armature of said one machine.

2. For a polyphase alternating current generating system comprising a plurality of electrodynamic machines each having an armature, an exciting field winding provided with an associated phase shift network and connections for effecting separate-excitation of a field winding of each of said machines by the armature voltage from another of said machines, a starting and stopping system comprising, in combination, a circuit including an auxiliary exciting winding for one of said machines energizable to self-excite said one machine and further including means normally rendering said circuit non-oscillatory, means including means operable at a predetermined armature voltage of said one machine to render said circuit oscillatory, and means operable at a given armature voltage of another of said machines to disconnect said circuit subsequent to operation of said first mentioned means, said last mentioned means being responsive to decrease in armature voltage of said other of said machines below said given value to reconnect said circuit.

3. In a polyphase generating system, the combination with a plurality of electrodynamic machines adapted to be rotated in unison and each having a field winding and an armature excitable thereby and current dephasing means for separately exciting the field winding of each machine with current generated by another of said machines, of circuit means including an auxiliary field winding for one of said machines normally connected to be energized by the armature of said one machine to render said one machine self-exciting, means operable at a predetermined voltage of said one machine to render said circuit means oscillatory, and means operable at a predetermined higher voltage of said one machine to connect said current dephasing means associated with said one machine and disconnect said circuit means.

4. In a polyphase generating system comprising a plurality of electrodynamic machines adapted to be driven in unison and each having a field winding and an armature excitable thereby, the combination of, a like plurality of phase shifting means each adapted to supply dephased separate-excitation current to the field winding of a machine from the armature of another of said machines, one of said phase shifting means being normally disconnected whereby supply of separate-excitation current from the armature of one machine to the field winding of another machine is prevented, a self-excitation circuit for said other machine including an auxiliary field winding normally rendering said circuit non-oscillatory, means including means operable at a predetermined voltage of the armature of said other machine to render said circuit oscillatory and means operable following rendering of said circuit oscillatory at a given voltage of said one machine to connect said one phase shifting means and disconnect said self-excitation circuit.

References Cited in the file of this patent
UNITED STATES PATENTS

| | | |
|---|---|---|
| 1,673,598 | Slepian | June 12, 1928 |
| 1,934,469 | Hull | Nov. 7, 1933 |
| 2,087,326 | Marrison | July 20, 1937 |
| 2,460,714 | Roys | Feb. 1, 1949 |
| 2,539,273 | Ringland | Jan. 23, 1951 |
| 2,619,629 | Schmitz | Nov. 25, 1952 |